United States Patent [19]
Stanley

[11] 3,774,929
[45] Nov. 27, 1973

[54] SHOPPING CART

[76] Inventor: Oscar M. Stanley, 370 First Ave., New York, N.Y. 10010

[22] Filed: Oct. 6, 1971

[21] Appl. No.: 187,024

[52] U.S. Cl.......... 280/41 R, 280/36 C, 280/DIG. 4
[51] Int. Cl.............................................. B62b 3/02
[58] Field of Search............. 280/36 C, 36 R, 41 C, 280/33.99 R, 33.99 A, DIG. 4; 211/126, 133, 211/181

[56] References Cited
UNITED STATES PATENTS

| | | | |
|---|---|---|---|
| 3,534,973 | 10/1970 | Elliott | 280/33.99 A |
| 3,503,622 | 3/1970 | Romero | 280/33.99 F |
| 3,207,526 | 9/1965 | Brodeck | 280/36 C |
| 3,388,920 | 6/1968 | Hill, Sr. et al. | 280/41 R |
| 3,191,956 | 6/1965 | Rizzuto | 280/36 R |
| 3,437,176 | 4/1969 | Ruttenberg et al. | 280/33.99 F |
| 2,613,951 | 10/1952 | Rusnak | 280/36 R |
| 2,648,442 | 8/1953 | Lowmaster | 211/181 |

FOREIGN PATENTS OR APPLICATIONS

| | | | |
|---|---|---|---|
| 98,026 | 12/1957 | Netherlands | 280/33.99 F |
| 990,272 | 2/1962 | Great Britain | 280/36 C |

*Primary Examiner*—Kenneth H. Betts
*Assistant Examiner*—David M. Mitchell
*Attorney*—A. Thomas S. Safford et al.

[57] ABSTRACT

A shopping cart having an auxiliary carrying section is shown. The shopping cart includes a bottom and four walls and has an open and a collapsed, coplanar configuration. The carrying section is removable and collapsible and comprises a bottom, two sides and a front wall. The carrying section provides an auxiliary container for merchandise and is supported on the top of the shopping cart when in use. The walls thereof are connected to one another by easily dismantled connections. The carrying section may be supported on the rear wall of the shopping cart in a collapsed position, when the shopping cart is itself in a collapsed position, so that the entire assembly may be conveniently stored.

3 Claims, 14 Drawing Figures

PATENTED NOV 27 1973 3,774,929
SHEET 1 OF 6
FIG. 1
FIG. 2
FIG. 3
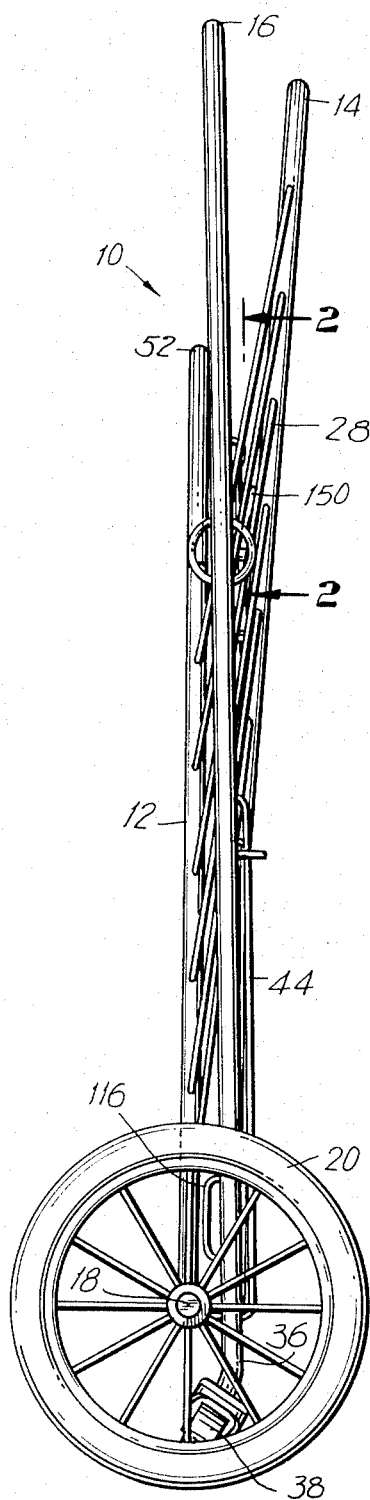
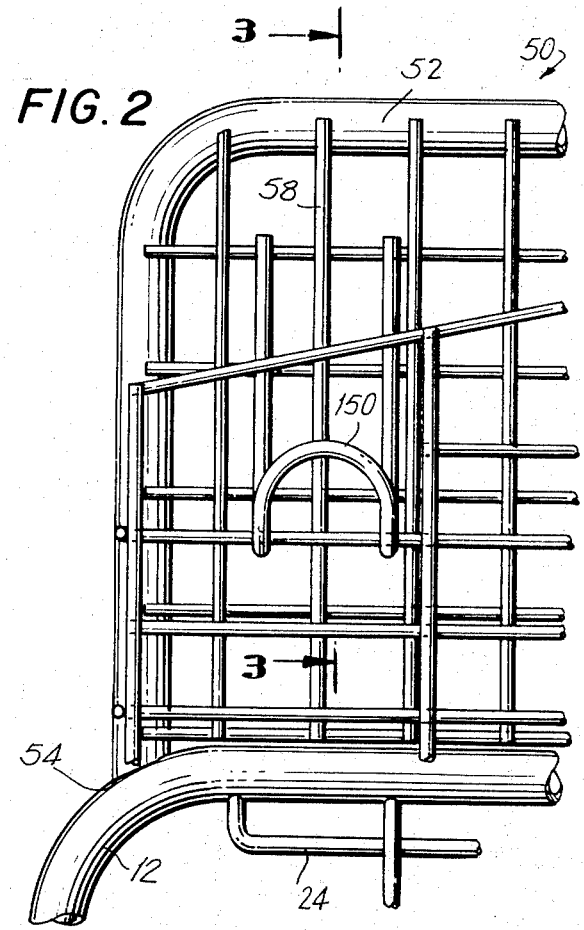
INVENTOR.
OSCAR M. STANLEY
BY
Curtis, Morris & Safford
ATTORNEYS

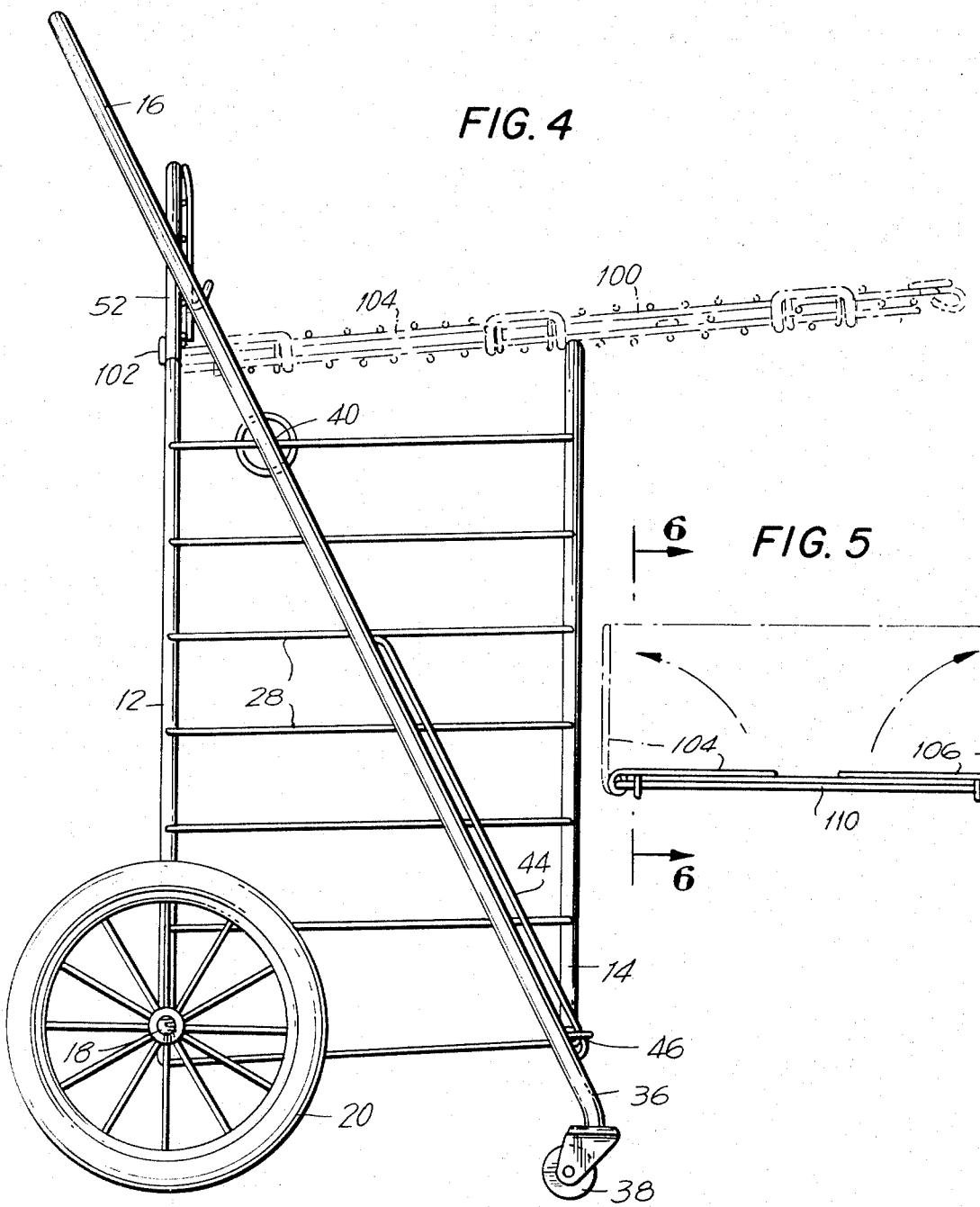

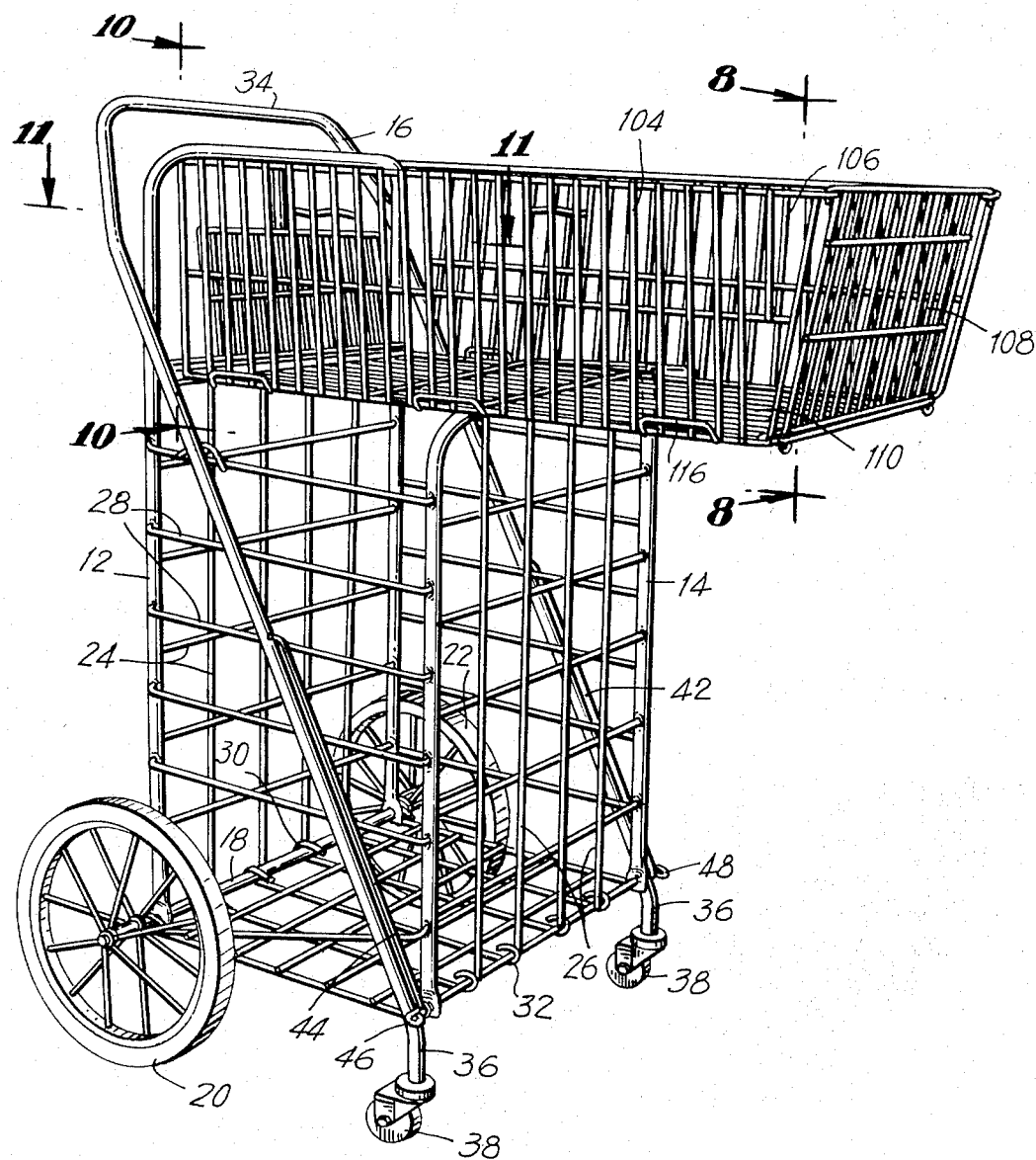

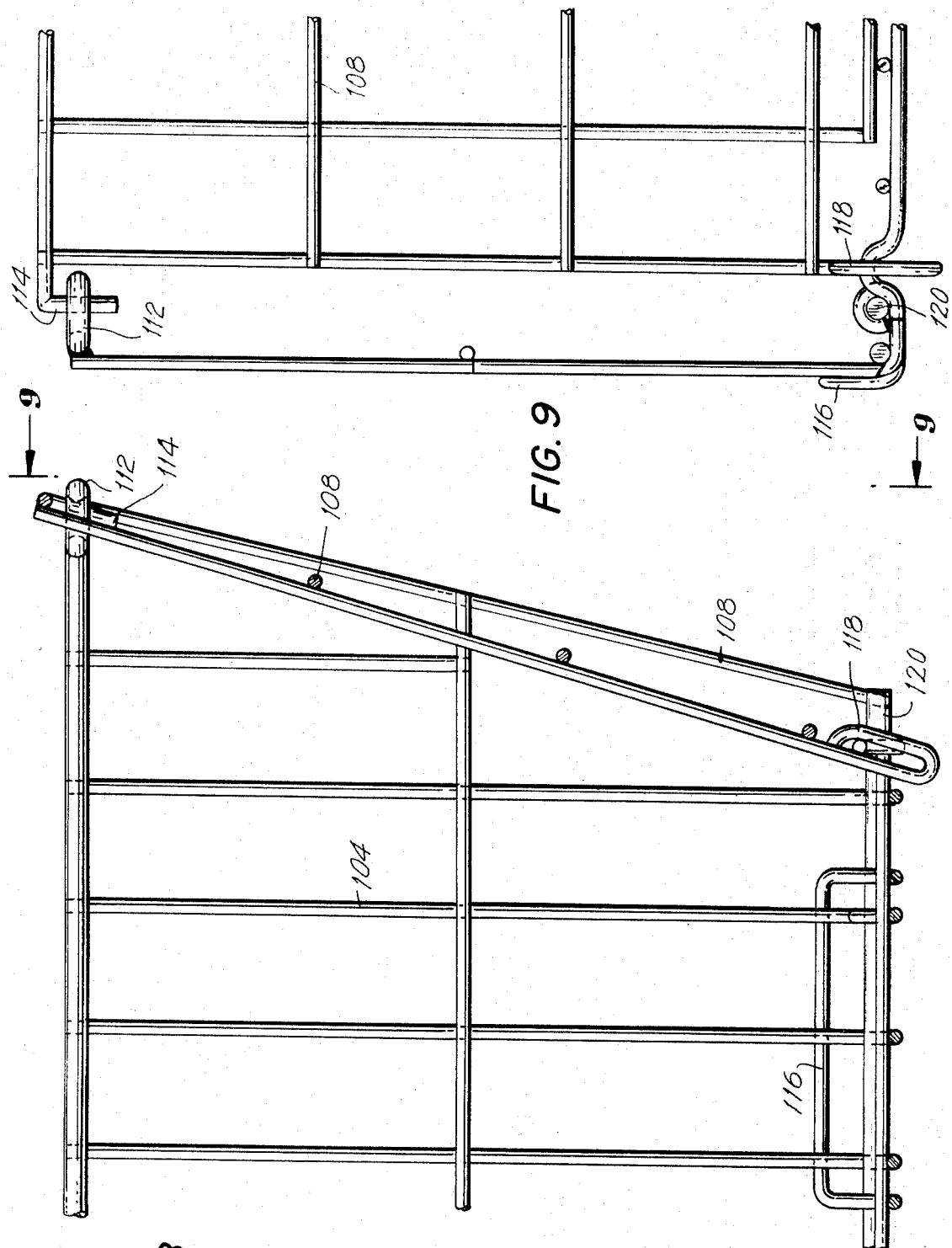

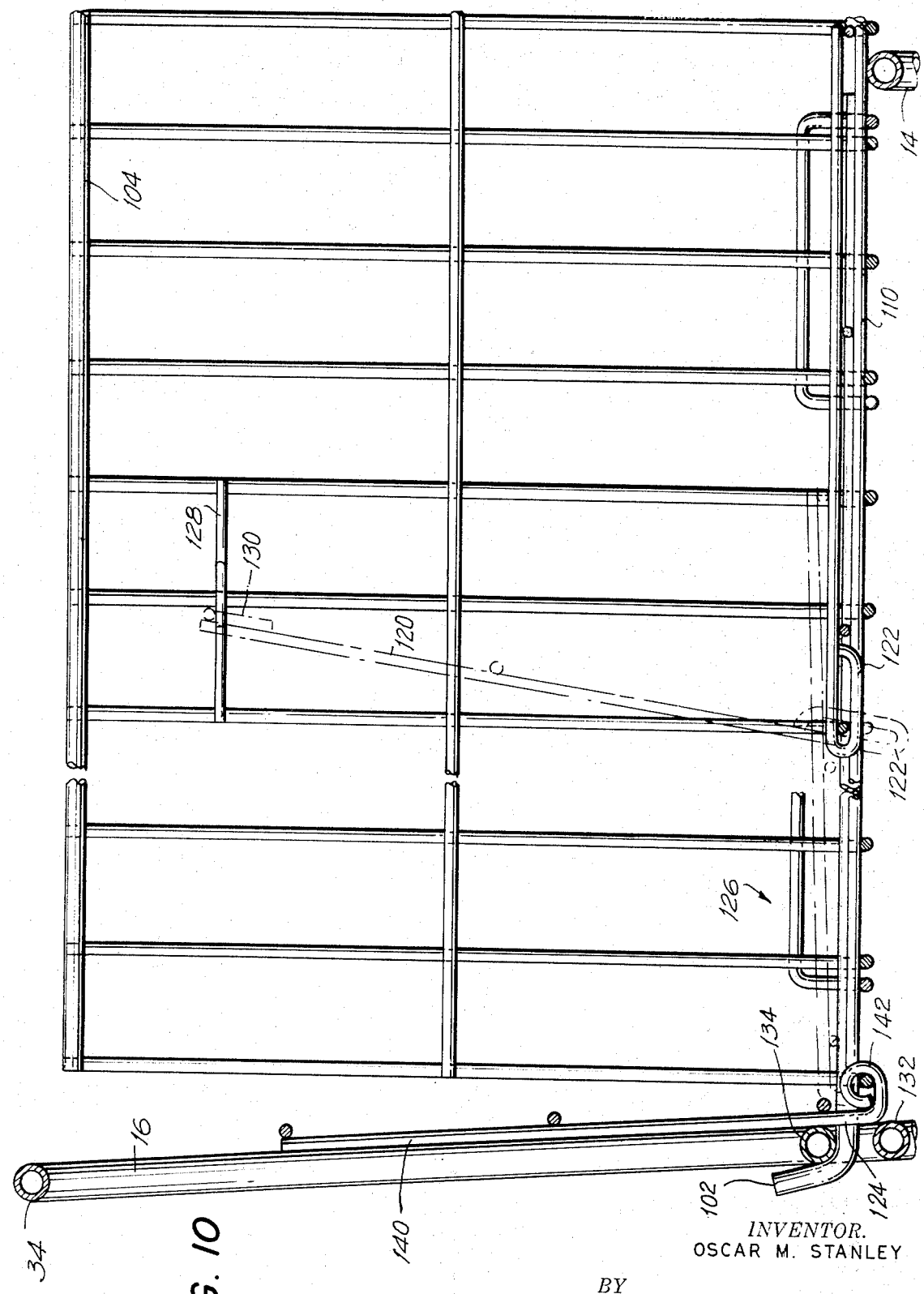

INVENTOR.
OSCAR M. STANLEY

BY

*Curtis, Morris & Safford*
ATTORNEYS

SHOPPING CART

This invention relates broadly to carrier vehicles and more specifically to shopping carts. More specifically, this invention relates to a collapsible shopping cart having a removable, collapsible carrying section associated with it.

In supermarkets and in self-service stores, the shopper typically collects items for purchase in a shopping cart. A number of designs have been developed for shopping carts, among them those shown in U. S. Pat. No. 3,168,328 and 3,388,920. Carts have become essential in food merchandising as they have proved to be the only practical means for a shopper to select merchandise and convey it to the check-out counter of the store.

The economics of food merchandising have indicated that a very substantial percentage of the cost of store operation is incurred at the check-out counter. A part of this cost can be traced to the investment in and the maintenance of shopping carts for the store's customers. The carts are relatively expensive to purchase and they are likewise expensive to maintain, collect and handle by the store's personnel. Furthermore, they take up valuable floor space and thus the indirect cost associated with them is even higher than would appear. It is necessary for the proprietor of the self-service market to provide a sufficient number of shopping carts for peak shopping periods and thus the average use of the carts is substantially less than optimum. The alternative is to provide a number of carts for the average shopping load; however, this will lead to inefficiency and loss of customers during peak hours. Still another source of risk to the self-service market stems from theft and loss of shopping carts.

Accordingly, it is a primary object of this invention to provide a shopping cart which can be owned by the customer and brought to and from the market and used therein.

It is a further object of this invention to provide a shopping cart which will be suitable for use by customers living close to the market and those living some distance away from it.

It is a further and related object of this invention to provide a shopping cart which is collapsible and thus can be stored in the trunk of an automobile or otherwise conveyed to and from the market.

It is still a further object of this invention to provide a shopping cart which provides a means for carrying merchandise within the store to the check-out counter and other means for carrying the merchandise away from the store.

It is still a further object of this invention to provide a shopping cart which has a further configuration in which it can be used as a seat for an infant.

It is a still further object to provide a low-cost, lightweight shopping cart that can be inexpensively purchased by each customer and thereby relieve the market of the responsibility and expense of purchasing and maintaining shopping carts.

These and other objects of this invention are achieved in a novel, collpsible shopping cart which comprises a rear frame member which describes an inverted U, having an axle spanning its lower ends, with wheels at its extremities, and wire wicker work in the area defined by the rear frame member, and a forward frame member, likewise describing an inverted U and having wire wicker work in the area defined by it, which wicker work includes two laterally extending guide elements at the lower corners thereof. By wire wicker work is meant any suitable woven wire or welded wire mesh. Wicker work or other suitable materials can also be used. The rear and forward frame members and the associated wicker work comprise the rear and forward walls of the shopping cart and they are joined at their side edges by sidewalls comprised of spaced horizontal wires which are hingedly mounted, for rotation in a vertical plane, in the rear and forward frames. The cart includes a bottom wall which is likewise comprised of wicker work including wire members hingedly mounted for rotation in a vertical plane on the axle and on the lower horizontal members of the wicker work associated with the forward frame. The cart is thus collapsible in a planar configuration with the bottom and forward wall of the shopping cart lying snugly against the rear wall thereof.

The cart also includes a handle frame member which describes an inverted U, its cross leg comprising the handle for the cart at the upper rear thereof. The handle frame member is positioned at an angle to the vertical and extends forwardly and downwardly outside of the sides of the cart, and is rotatably connected at either side to the upper wires which form the sidewalls of the cart. A guide sleeve is provided along the upper edge of the handle frame for receiving the guide elements asoociated with the forward frame wicker work. The guide sleeve controls the configuration of the shopping cart in the collapsed position.

The shopping cart of this invention includes a removable, collapsible carrying section. The carrying section is comprised of a bottom adapted to be attached to the shopping cart and supported on the top thereof. The carrying section also includes a front and two side walls which are hingedly attached to the bottom and are adapted to be attached to one another at their common intersection when in an upright position. The carrying section is thus collapsible into a planar configuration and can be stored conveniently within the collapsed shopping cart. When in use, it provides an auxiliary, top-mounted carrying section for merchandise supported at a convenient level on top of the shopping cart. The bottom of the carrying section desirably includes upright stop means at its lateral sides for supporting the side walls of the carrying section in an upright position. Desirably the rear wall of the shopping cart extends upwardly and above the top of the shopping cart, thereby forming a rear wall of the carrying section as well. Alternatively, the rear wall may be hingedly attached to the bottom at a point sufficiently forward of the rear edge thereof to provide a child's seat area at the rear of the bottom of the carrying section. In this embodiment, the upwardly extended rear wall of the shopping cart is free of wicker work and instead includes a single median vertical bar, thus defining two areas through which a child can extend his feet and a safety bar to prevent the child from falling from the seat in the carrying section. Desirably, the upper part of the rear wall of the shopping cart includes hooks for supporting the collapsed carrying section.

In the drawings:

FIG. 1 is a side view of the collapsible shopping cart and the auxiliary carrying section both in a collapsed position;

FIG. 2 is a front view of the upper portion of the collapsed cart and carrying section of FIG. 1 taken along lines 2—2 of FIG. 1;

FIG. 3 is a section view of the structure shown in FIG. 2 taken along lines 3—3 of FIG. 2;

FIG. 4 is a side elevation view of the collapsible shopping cart of this invention in an open position having the collapsible carrying section mounted in place but in a collapsed position;

FIG. 5 is a front view of the carrying section showing the side walls in both a nested position and an open position;

FIG. 6 is a side view of the carrying section in both the nested and the open position;

FIG. 7 is a perspective view of the shopping cart and the carrying section fully assembled;

FIG. 8 is a side detail elevation of the carrying section shown in FIG. 7 taken along lines 8—8 of FIG. 7;

FIG. 9 is a forward elevation of the portion of the carrying section shown in FIG. 8 taken along lines 9—9 of FIG. 8;

FIG. 10 is a side elevation of the rear portion of the carrying section shown in FIG. 7, and showing the baby-seat configuration thereof, taken along lines 10—10 of FIG. 7;

Figure 11:
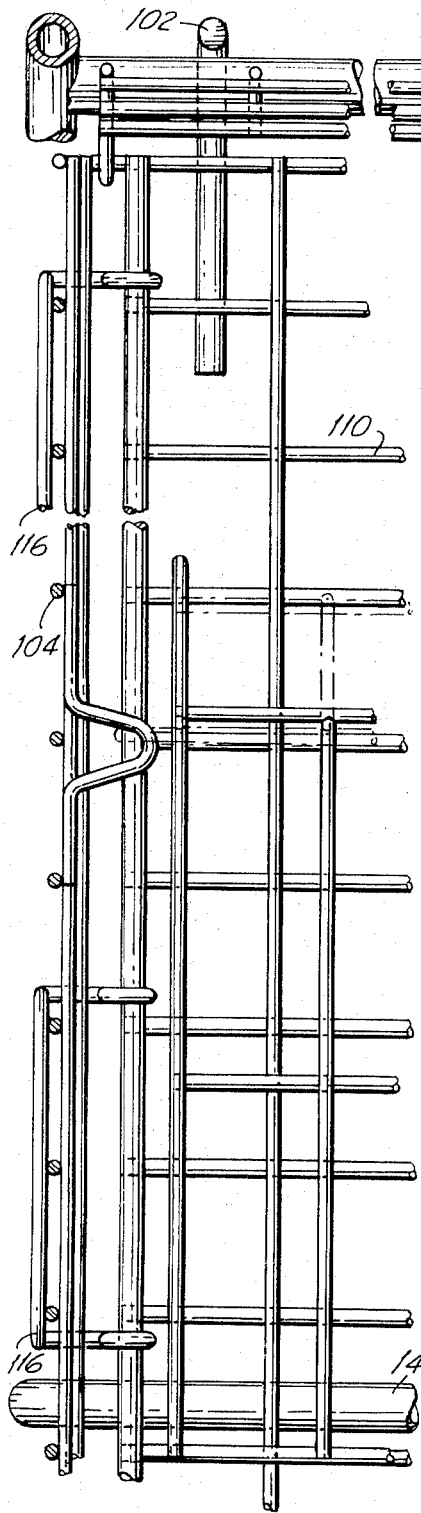
FIG. 11 is a plan view of the carrying section of FIG. 7 taken along lines 11—11 of FIG. 7.

With reference now to FIGS. 1 – 4 and FIG. 7, reference numeral 10 identifies a shopping cart having a rear frame member 12 which describes an inverted U, a forward frame member 14 which likewise describes an inverted U and a handle frame member 16, likewise describing an inverted U. Rear frame member 12 has an axle 18 spanning its lower ends with wheels 20 and 22 at the extremities thereof. The rear wall of the shopping cart is comprised of wicker work 24 comprised of wire or the like. The forward wall of the shopping cart likewise is comprised of wire wicker work 26. The side walls of the shopping cart are comprised of spaced horizontal wires 28 which are hingedly mounted for rotation in a vertical plane in the rear and front frames 12 and 14 respectively. Similarly, the bottom of the shopping cart is defined by wire members hingedly mounted for rotation in a vertical plane on axle 18 and on the lower horizontal member of the wicker work associated with forward frame 14. The hinged mounting of the wire members comprising the bottom wicker work are designated by reference numerals 30 and 32 respectively. Handle frame member 16 has an upper cross leg 34 which forms the handle for the cart and is positioned at the upper rear thereof. The handle frame member extends at an angle to the vertical and extends forwardly and downwardly outside of the lateral sides of the shopping cart defined by rotatable wires 28, terminating in a short vertical section 36 having casters 38 mounted thereupon. Handle frame 16 is rotatably connected to the upper side wire of each lateral side of the shopping cart. This rotatable connection is shown in FIG. 4 at reference numeral 40. At the upper edges of handle frame member 16, at the lower parts thereof, are guide sleeves 42 and 44. Located in the slot defined by guide members 42 and 44 and the respective legs of handle frame member 16 are guide elements 46 and 48 which are connected to the lowest wire in the wicker work associated with the forward wall of the shopping cart. Guide elements 46 and 48 have enlarged heads and thus are securely retained within the guide sleeves. As shown best in FIGS. 1 and 4, shopping cart 10 is collapsible from its open position by upward movement and rotation of the bottom, side and front walls thereof. In collapsing into its co-planar nested position, guide elements 46 and 48 move upwardly in the guide slots defined by guide rails 42 and 44. The shopping cart desirably includes a rear side wall 50 which extends upwardly above rear frame 12. This elevated rear wall is comprised of a superstructure frame 52 in an inverted U shape which is connected at its lower extremities 54 and 56 to the top of rear frame 12. The rear wall is defined by wire wicker work 58.

The shopping cart of this invention includes a removable, collapsible carrying section designated by reference numeral 100 which is adapted to be attached to the rear wall or the rear wall extension of the shopping cart and to be supported on the top thereof. As shown in FIG. 4 the collapsed carrying section includes hook member 102 which snugly interlocks within the wicker work or a special portion of the wicker work located on the rear wall of the main body of the shopping cart. The weight at the rear of the carrying section is thus supported by a cross-brace on the rear wall of the shopping cart or on the wicker work thereof. The forward part of the carrying section is supported on top of the forward frame member 14. Carrying section 100 includes two side walls 104 and 106 and a forward wall 108. These three walls are hingedly attached to a bottom 110. The two side walls, the forward wall and the bottom are all comprised of wire wicker work. The side walls 104 and 106 and the front wall 108 are adapted to be connected to one another at their common intersections when in an upright position. This is shown most clearly in FIGS. 8 and 9.

With reference to FIGS. 8 and 9, reference numeral 112 refers to an eye at the upper forward extension of side wall 104. A hook 114 at the upper lateral extension of front wall 108 mates with eye 112 thus securing the two walls to one another in a relatively firm engagement. Also clearly seen in FIGS. 8 and 9 are upright stops 116 which are connected at the lateral sides of bottom 110 and serve to support side walls 104 and 106 in an upright position. The hinged mountings shown at reference numerals 118 and 120 are typical and satisfactory. However, other hinged connections can be used.

In its open configuration, the carrying section is defined by the bottom, the two sides, the front and as well by the upwardly extended rear wall of the shopping cart. An alternative embodiment shown in FIG. 10 includes a rear wall 120 which is hingedly mounted at 122 to bottom 110. Rear wall 120, which is, like the others, of a suitable wicker construction is located sufficiently forward of the rear edge 124 of the carrying section to provide a child's seat area designated generally by reference numeral 126 towards the rear of the carrying section. The rear wall 120, in its upright position, is attached to a cross-member 128 on side wall 104 by means of hook 130 attached to it at its upper lateral extension. Other connecting means such as hooks and eyes may be used.

The preferred connection between the carrying section 100 and the rear wall of the shopping cart is also shown in FIG. 10. Thus, the hook 102 connected to bottom 110 of the carrying section passes between horizontal members 132 and 134. In still a further embodiment shown in FIG. 10, the rear wall of the carrying section may be defined by a rear wall 140 which is hingedly attached to bottom 110 at 142. When the carrying section includes a child's seat, the upward extension of the shopping cart does not include wicker work. Rather, it consists of the upper frame member 52 and a single verticle median bar extending from the top crossbar to the crossbar of the rear frame. This median vertical bar defines two areas through which the child can put his feet and at the same time prevents him from falling out of the child's seat.

As shown in FIGS. 1 and 3, the carrying section may be conveniently supported on the rear wall, and more desirably on the extended rear wall of the shopping cart by means of suitable hooks. These hooks are designated by reference numeral 150 and they may be, for example, simple support hooks attached to the wicker work which defines the rear wall of the shopping cart. As shown in FIG. 3, the collapsed carrying section 100 is supported at any suitable cross-member in bottom 110 on hook 150. The collapsed carrying section thus lies vertically and parallel with the rear wall of the shopping cart and is collapsed into the shopping cart for convenient storage as shown in FIG. 1.

Figure 12:
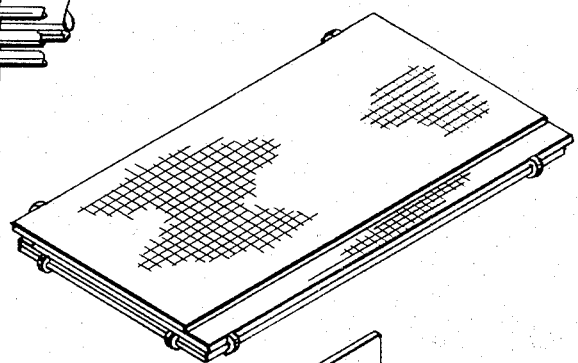
FIG. 12 is a simplified schematic representation of a carrying section in the collapsed configuration.
Figure 13:
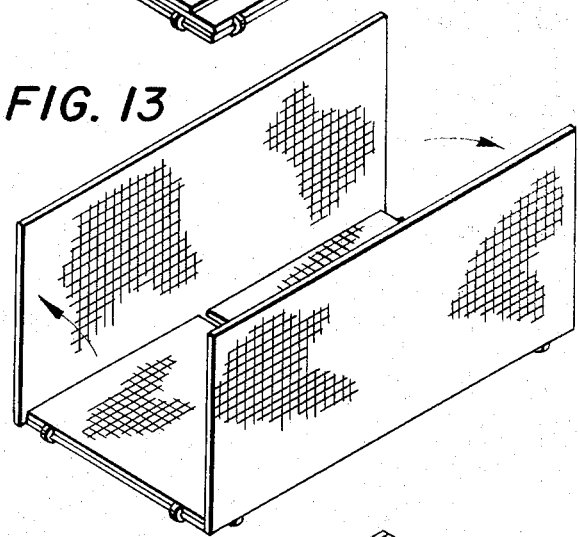
FIG. 13 is the carrying section of FIG. 12 in a partially opened configuration.
Figure 14:
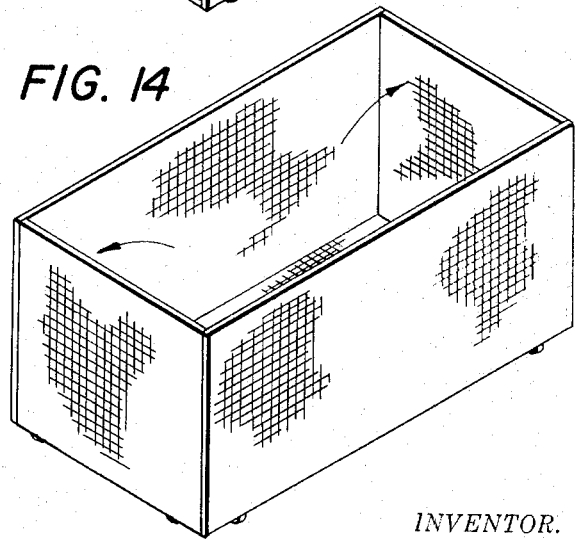
FIG. 14 is the fully opened carrying section of FIG. 12.

As shown in FIGS. 12, 13 and 14, the carrying section is comprised of side, front and rear walls and a bottom member which may be collapsed in various configurations.

Although the invention has been described in connection with a shopping cart of the configuration shown, it can be used to advantage with shopping carts of collapsible or rigid design. The carrier section may also be used in conjunction with other types of carrier vehicles such as strollers, bicycles and the like.

What is claimed is:

1. A collapsible shopping cart comprising: a rear frame member describing an inverted U and having an axle spanning its lower ends, with wheels at the extremities thereof, and wire wicker work in at least the lower area defined by said rear frame member; a forward frame member shorter than said rear frame member describing an inverted U and having wire wicker work in the area defined by said forward frame member, said wicker work including two laterally extending guide elements at the lower corners thereof; side walls comprised of spaced horizontal wires pivotally mounted for rotation in a vertical plane in said rear and front frames; a bottom wall comprised of wicker work including wire members pivotally mounted for rotation in a vertical plane on said axle and on the lower horizontal member of the wicker work on said forward frame; a handle frame member describing an inverted U, its cross leg comprising the handle for said cart at the upper rear thereof, positioned at an angle to the vertical and extending forwardly and downwardly on the outside of the sides of said cart, said handle frame member being rotatably connected at both sides thereof to the upper wires forming the side walls of said cart and having a guide means along upper surface of its lower legs for receiving said guide elements associated with the said forward frame wicker work; means for supporting casters at both lower ends of said handle frame member, including casters positioned so that the said bottom wall of said shopping cart is substantially parallel with the ground when said cart is supported on its said wheels and casters; and a completely detachable, collapsible, auxiliary carrying section comprising a bottom wall which in its assembled position is supported by the top of said forward frame member and a front and two side walls hingedly attached to said bottom and adapted to be attached to one another at their common intersections when in an upright position wherein said auxiliary carrying section includes a rear wall hingedly connected to said bottom wall, said rear wall, in its upright position, closing off the space in the upper area defined by said rear frame member and an intermediate rear wall hingedly connected to said bottom wall, said intermediate rear wall being positioned so that in its upright position it is attached to and supported by said side walls and provides a rear upright to a child's seat formed by the rear of said auxiliary carrying section.

2. A collapsible shopping cart as recited in claim 1 wherein the upper area defined by said rear frame member includes substantially flush, inwardly protruding hooks for supporting said auxiliary carrying section in its collapsed position.

3. A collapsible shopping cart as recited in claim 2 wherein said auxiliary carrying section in its collapsed position is supported on said inwardly protruding hooks at a position intermediate its forward and rearward ends.

* * * * *